United States Patent
Moriyama et al.

(10) Patent No.: US 11,667,838 B2
(45) Date of Patent: Jun. 6, 2023

(54) QUANTUM DOT MATERIAL AND METHOD FOR PRODUCING QUANTUM DOT MATERIAL

(71) Applicant: SHOEI CHEMICAL INC., Tokyo (JP)

(72) Inventors: Takafumi Moriyama, Corvallis, OR (US); Aya Midorikawa, Corvallis, OR (US)

(73) Assignee: SHOEI CHEMICAL, INC., Tokyo (JP)

( * ) Notice: Subject to any disclaimer, the term of this patent is extended or adjusted under 35 U.S.C. 154(b) by 1026 days.

(21) Appl. No.: 16/097,136

(22) PCT Filed: Apr. 26, 2017

(86) PCT No.: PCT/JP2017/016494
§ 371 (c)(1),
(2) Date: Oct. 26, 2018

(87) PCT Pub. No.: WO2017/188300
PCT Pub. Date: Nov. 2, 2017

(65) Prior Publication Data
US 2019/0112527 A1    Apr. 18, 2019

Related U.S. Application Data

(60) Provisional application No. 62/327,910, filed on Apr. 26, 2016.

(51) Int. Cl.
  *C09K 11/72*  (2006.01)
  *C09K 11/88*  (2006.01)
  (Continued)

(52) U.S. Cl.
  CPC .......... *C09K 11/883* (2013.01); *C09K 11/025* (2013.01); *B82Y 20/00* (2013.01);
  (Continued)

(58) Field of Classification Search
  CPC ........ C09K 11/00; C09K 11/72; C09K 11/883
  See application file for complete search history.

(56) References Cited

U.S. PATENT DOCUMENTS 6,179,912 B1   1/2001   Barbera-Guillem et al.
8,101,021 B2   1/2012   Yen et al.
(Continued)

FOREIGN PATENT DOCUMENTS

JP   2003511251 A   3/2003
JP   2006188666 A   7/2006
(Continued)

OTHER PUBLICATIONS

Manzoor et al., "Synthesis and Photoluminescent Properties of ZnS Nanocrystals Doped with Copper and Halogen," Materials Chemistry and Physics, vol. 82, No. 3, Dec. 20, 2003, 8 pages.
(Continued)

*Primary Examiner* — Matthew E. Hoban
(74) *Attorney, Agent, or Firm* — Alleman Hall Creasman & Tuttle LLP

(57) ABSTRACT

An object of the present invention is to provide a core/shell type quantum dot material capable of increasing the photoluminescence quantum yield and a method of manufacturing the same. The quantum dot material according to one embodiment of the present invention is a quantum dot material comprising a plurality of nanoscopic core-shell structures, each nanoscopic core-shell structure including a nanocrystalline core including phosphorus and indium, a shell disposed on the nanocrystalline core, and a modifier comprising at least one of chlorine and bromine, wherein the content of chlorine and/or bromine is within a range of 2 to 15 mass % of the quantum dot material.

20 Claims, 8 Drawing Sheets

(51) Int. Cl.
  *C09K 11/02* (2006.01)
  *B82Y 30/00* (2011.01)
  *B82Y 20/00* (2011.01)
  *B82Y 40/00* (2011.01)
  *G01N 23/201* (2018.01)

(52) U.S. Cl.
  CPC .............. *B82Y 30/00* (2013.01); *B82Y 40/00* (2013.01); *G01N 23/201* (2013.01)

(56) References Cited

U.S. PATENT DOCUMENTS

| | | | |
|---|---|---|---|
| 8,420,155 | B2 | 4/2013 | Nie et al. |
| 2007/0125984 | A1 | 6/2007 | Tian et al. |
| 2013/0315391 | A1 | 11/2013 | Yao et al. |
| 2014/0026417 | A1 | 1/2014 | Lin et al. |
| 2014/0369024 | A1 | 12/2014 | Xu et al. |
| 2015/0083969 | A1* | 3/2015 | Kim ............... C09K 11/88 252/301.6 S |
| 2017/0179338 | A1 | 6/2017 | Park et al. |

FOREIGN PATENT DOCUMENTS

| | | |
|---|---|---|
| JP | 2008008893 A | 1/2008 |
| JP | 2009526089 A | 7/2009 |
| JP | 2015516467 A | 6/2015 |
| KR | 20150034621 A | 4/2015 |
| WO | 2014208456 A1 | 12/2014 |

OTHER PUBLICATIONS

H. Fu, et al., "InP quantum dots: Electronic structure, surface effects, and the redshifted emission," Physics Review, vol. 56, No. 3, Jul. 15, 1997, 14 pages.
O. I. Micic et al., "Size-Dependent Spectroscopy of InP Quantum Dots," The Journal of Physical Chemistry B, 101, 1997, 9 pages.
D. Talapin et al., "Etching of Colloidal InP Nanocrystals with Flourides: Photochemical Nature of the Process Resulting in High Photoluminescence Efficiency," Journal of Physical Chemistry, 106, 2002, 5 pages.
S. Adam et al., "Photoemission study of size selected InP nanocrystals: the relationship between luminescence yield and surface structure," The European Physical Journal D, 24, 2003, 5 pages.
S. Adam et al., "The effect of nanocrystal surface structure on the luminescence properties: Photoemission study of HF-etched InP nanocrystals,"The Journal of Chemical Physics, 123, 2005, 11 pages.
G. Niu et al., "Inorganic halogen ligands in quantum dots: I-, Br-, Cl- and film fabrication through electrophoretic deposition," Physical Chemistry Chemical Physics, 15, 45, Aug. 2013, 9 pages.
M. Meyns et al., "Shape Evolution of CdSe Nanoparticles controlled by Halogen Compounds," Chemistry of Materials, 26, Jan. 2014, 11 pages.
A. Mnoyan et al. "Electrostatic Stabilized InP Colloidal Quantum Dots with High Photoluminescence Efficiency," Langmuir, 31, 25, Jun. 2015, 6 pages.
F. Gerdes et al., "Review: Halogens in the synthesis of colloidal semiconductor nanocrystals," Zeitschrift für Physikalische Chemie, Mar. 2018, 19 pages.
International Bureau of WIPO, International Preliminary Report on Patentability Issued in Application No. PCT/JP2017/016494, dated Nov. 8, 2018, WIPO, 18 pages.

* cited by examiner

QUANTUM DOT MATERIAL AND METHOD FOR PRODUCING QUANTUM DOT MATERIAL

CROSS REFERENCE TO RELATED APPLICATIONS

This application is the national phase of International Application No. PCT/JP2017/016494, filed Apr. 26, 2017, which claims priority to U.S. Provisional Patent Application Ser. No. 62/327,910, filed Apr. 26, 2016, the entireties of which are hereby incorporated herein by reference for all purposes.

TECHNICAL FIELD

The present invention relates to quantum dot material, and a method for producing quantum dot material.

BACKGROUND ART

A quantum dot (QD) is a semiconductor crystallite small enough to demonstrate 'quantum confinement.' In this size regime, excitons generated within a crystallite are confined spatially by the crystallite's small dimensions. Various optical properties of a QD are size-dependent, therefore, and tunable provided that QDs of the desired size can be isolated. This property may be exploited in technologies leveraging the emissive properties of QDs—e.g., color displays, lighting, lasing—as well as technologies leveraging absorptive properties—photon detection, photovoltaic applications, etc. Tunability also may be exploited to make specialized electrooptical materials and/or components, such as light-emitting diodes and down-shifting color-conversion sheets.

For visible-wavelength emissive applications, cadmium selenide (CdSe) QDs are often used because they exhibit high photoluminescence quantum yields (PLQYs). Less toxic indium phosphide (InP) QDs may also be used. InP has a zinc blende crystal structure, a first-exciton Bohr radius of 11 nanometers (nm), and a band gap of 1.344 electron-volts in bulk, corresponding to a band edge wavelength of 918 nm at 300 Kelvin. These properties are desirable for visible-wavelength emissive applications. Relative to CdSe, however, InP QDs generally exhibit lower PLQYs.
  i. As methods for producing the QD materials, for example, methods described in Patent Literatures 1 to 7 are known.

SUMMARY OF THE INVENTION

Technical Problem

The present invention is intended to provide core/shell type quantum dot materials capable of increasing the photoluminescence quantum yield and a method of manufacturing the same.

Solution to Problem

The quantum dot materials according to an embodiment of the present invention adopts the following configurations.
(1) A quantum dot material comprising a plurality of nanoscopic core-shell structures, each nanoscopic core-shell structure including:
  a nanocrystalline core including phosphorus and indium,
  a shell disposed on the nanocrystalline core; and
  a modifier comprising at least one of chlorine and bromine,
    wherein the content of chlorine and/or bromine is 2 to 15 mass % of the quantum dot material.
(2) The quantum dot material according to (1) above, wherein the content of chlorine and/or bromine is 4 to 8 mass % of the quantum dot material.
(3) The quantum dot material according to (1) or (2) above, wherein the nanocrystalline core is InP and the shell is ZnS.
(4) The quantum dot material according to any one of (1) to (3) above, wherein the quantum dot material further includes an intermediate shell, and the intermediate shell includes ZnSe.
(5) The quantum dot material according to any one of (1) to (4) above, wherein the quantum dot material has on the shell an inorganic material layer that suppresses outflow of the modifier.
(6) The quantum dot material according to (5) above, wherein the inorganic material layer is one or more selected from the group consisting of $Al_2O_3$, $SiO_2$, ZnO, $TiO_2$, $Y_2O_3$, $HfO_2$ and MgO.
(7) The quantum dot material according to any one of (1) to (6) above, wherein the photoluminescence quantum yield (PLQY) is 80% or more.
(8) The quantum dot material according to any one of (1) to (7) above, wherein PLQY after leaving indoors for 10 days is 70% or more.

A method for producing quantum dot materials according to an embodiment of the present invention adopts the following configurations.
(9) A method for producing a quantum dot (QD) material comprising the following steps:
  the core-forming metal complex is mixed with the pnictogen compound to form a nanocrystalline core material,
  adding a modifier containing chlorine and/or bromine to the solution containing the nanocrystalline core material,
  modifier treating the surface of the nanocrystalline core material with the modifier,
  mixing an outer shell forming metal complex and a chalcogen compound with a solution containing the modifier treated nanocrystalline core material to form an outer shell on each of the modified nanocrystalline core material, and
  modifier treating the surface of the outer shell with the modifier added to the solution containing the nanocrystalline core material,
(10) A method for producing the quantum dot material according to (9) above, before forming the outer shell, further containing the following steps:
  forming an intermediate shell on the surface of the modifier treated nanocrystalline core material, and
    modifier treating the surface of the intermediate shell with the modifier added to the solution containing the nanocrystalline core material.
(11) The method for producing a quantum dot material according to (9) or (10) above, wherein the modifier is a carboxylic acid chloride and/or a carboxylic acid bromide.
(12) The method for producing a quantum dot material according to any one of (9) to (11) above, which includes adjusting the molar ratio of the modifier such that the content of chlorine and/or bromine in the resultant quantum dot material is 2 to 15 mass %.
(13) The method for producing a quantum dot material according to any one of (9) to (12) above, wherein the core-forming metal complex is a chelate of a group IIIA metal ion, and the outer shell-forming metal complex is a chelate of a group IIB metal ion.

(14) The method for producing a quantum dot material according to any one of (9) to (13) above, wherein the core-forming metal complex is a chelate of trivalent indium.
(15) The method for producing a quantum dot material according to any one of (9) to (14) above, wherein the outer shell-forming metal complex is a divalent zinc chelate.
(16) The method for producing a quantum dot material according to any one of (9) to (15) above, wherein the core-forming metal complex and/or the outer shell-forming metal complex comprises a carboxylate complex.
(17) The method for producing a quantum dot material according to any one of (9) to (16) above, wherein the modifier is a carboxylic acid chloride.
(18) The method for producing a quantum dot material according to any one of (9) to (17) above, wherein the pnictogen compound contains amine, phosphine, or arsine.
(19) The method for producing the quantum dot material according to any one of (9) to (18) above, wherein the chalcogen compound contains thiol or selenol.
(20) The method for producing a quantum dot material according to any one of (9) to (19) above, further comprising thermally activating the mixed core-forming metal complex and the pnictogen compound.
(21) The method for producing a quantum dot material according to any one of (9) to (20) above, further comprising a growth incubation of the nanocrystalline core material.
(22) The method for producing a quantum dot material according to (21) above, wherein the growth incubation is performed under continuous flow conditions.
(23) The method for producing a quantum dot material according to any one of (9) to (22) above, wherein the modifier treated nanocrystalline core material is mixed with the outer shell-forming metal complex and the chalcogen without forming a lattice matching intermediate shell in advance.
(24) The method for producing a quantum dot material according to any one of (9) to (23) above, further comprising monitoring the photoluminescence of the nanocrystalline core material and adjusting the amount of the modifier to optimize the photoluminescence.
(25) The method for producing a quantum dot material according to any one of (9) to (24) above, wherein the treatment using the modifier includes heat treatment.
(26) The method for producing a quantum dot material according to any one of (9) to (25) above, wherein the treatment using the modifier comprises treating in a solution of a nonpolar solvent.
(27) The method for producing a quantum dot material according to any one of (9) to (26) above, wherein the mixture of the core-forming metal complex and the pnictogen compound also includes mixing with the divalent zinc carboxylate.

The Summary above is provided to introduce a selected part of this disclosure in simplified form, not to identify key or essential features. The claimed subject matter, defined by the claims, is limited neither to the content of the Summary nor to implementations that address the problems or disadvantages noted herein.

Advantageous Effects of the Invention

The present invention can provide core/shell type quantum dot materials capable of increasing the photoluminescence quantum yield and a method of manufacturing the same.

DESCRIPTION OF EMBODIMENTS

Figure 1:
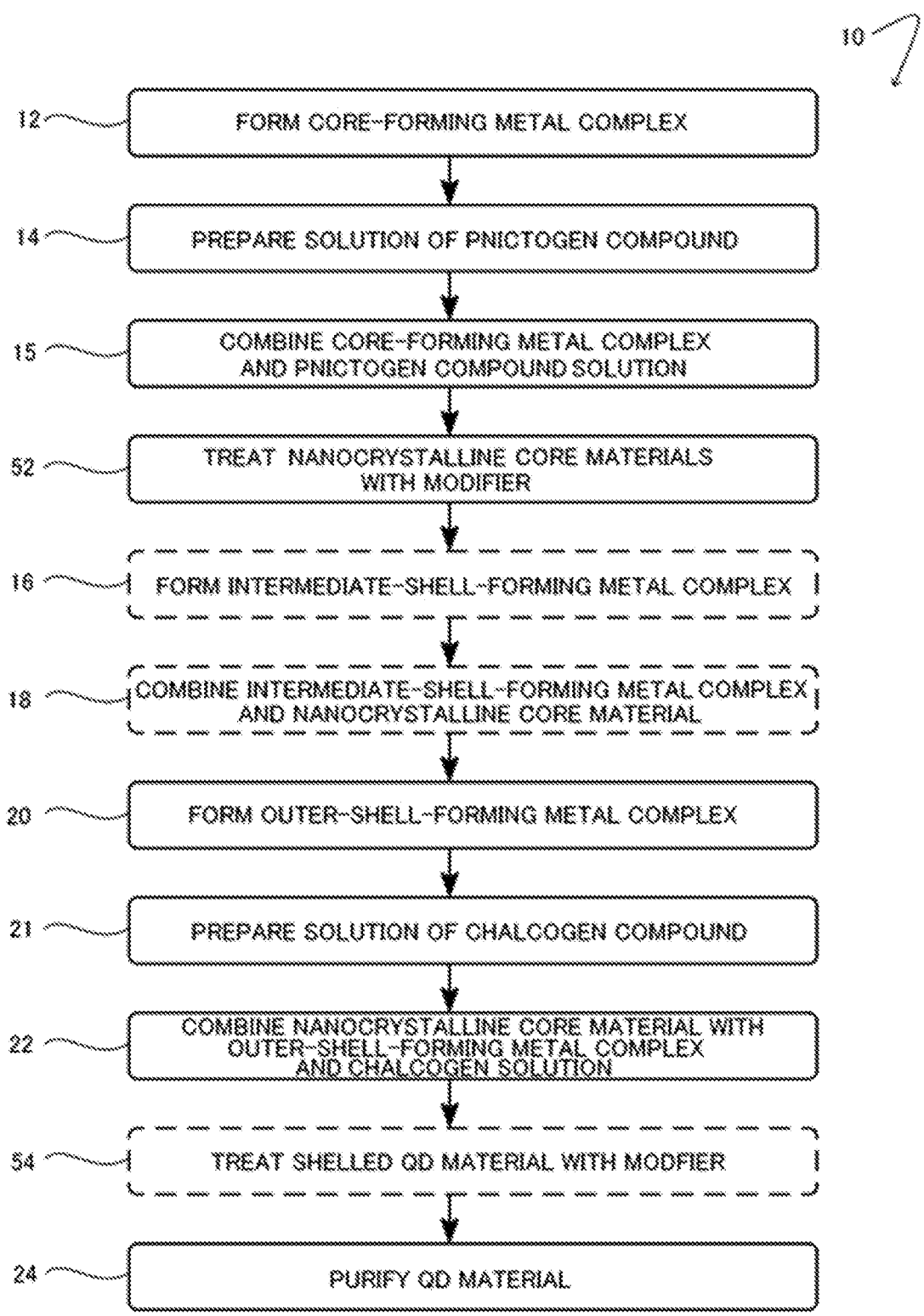
FIG. 1 shows aspects of an example QD preparation method.

Examples are disclosed that relate to PLQY enhancement in core-shelled QD materials. One aspect of this disclosure provides a method for making a QD material. The method includes combining a core-forming metal complex with a pnictogen compound to form a nanocrystalline core material, treating the nanocrystalline core material with chloride and/or bromide via a modifier, and combining the treated nanocrystalline core material with a mixture of an outer-shell-forming metal complex and a chalcogen compound. In another method, the treatment with the modifier is enacted after outer-shell formation.

Another aspect of this disclosure provides a QD material comprising a plurality of nanoscopic core-shell structures, each structure including a nanocrystalline InP core, a zinc sulfide (ZnS) or zinc selenide (ZnSe) shell arranged on the core, and adherent chlorine and/or adherent bromide at 2 to 15% by mass of the QD material. When the QD material contains both chlorine and bromine, the total content of chlorine and bromine in the QD material is 2 to 15% by mass.

A major non-radiative deactivation process for nanocrystalline QDs is exciton relaxation through interaction with the surface trap states of the core material. Largely as a result of this process, the PLQY of unshelled InP QDs is limited to a few percent. Trap states in unshelled QDs are associated, in large part, with 'dangling bonds' at the surface of the particles. A core-shell (CS) architecture may be used to passivate the dangling bonds and thereby increase the PLQY. In some InP examples, wider band-gap semiconductors such as zinc sulfide (ZnS) or zinc selenide (ZnSe) may be used as shell materials to confine the exciton to the InP core, and to passivate the surface by binding any dangling bonds. This approach has been shown to increase the PLQY of InP QDs to about 50%.

Without tying this disclosure to any particular theory, the inventors herein suggest that defects at the core-shell interface and/or the outer-shell surface may provide additional trap states, which limit the PLQY. In one of the approaches disclosed herein, a modifier is used to fill, or passivate, the defect states of InP QDs. This results in significant PLQY enhancement, which translates into improved emission properties for end-use applications. In another approach, a modifier is used to fill defect states on the wider band-gap outer shell of a QD. The passivation methods disclosed herein are amenable to flow-cell synthesis, for reduced particle-size dispersity. Furthermore, various chemical reagents that may be used to passivate with a modifier are inexpensive, easily handled, and have low toxicity. As the modifier, one containing at least either chlorine or bromine, such as chloride and/or bromide, can be used.

To give a better understanding of the type of QD material to which these methods apply, one example of QD synthesis is described below. It will be understood however, that the synthetic techniques presented herein are not limited to the described QD material or preparation method, but may be applied to any other suitable QD material. Additional exemplary QD materials and processes for making QD materials are described in U.S. Pat. Nos. 6,179,912, 8,101,021, and 8,420,155, in U.S. Patent Application Publications 2012/0315391 and 2014/0264171, and in Japanese Patent Application Publication 2006/188666. Each of these disclosures is hereby incorporated by reference herein.

FIG. 1 illustrates aspects of an example QD preparation method 10. In this method, shell-supporting, ligand-encapsulated QDs are prepared. The method is applicable, for example, to QDs having an InP core, a gallium phosphide (GaP) intermediate shell, and a ZnS outer shell. The particular conditions set forth below are appropriate for making red-emitting ($\lambda_{max}$ at 630 nm) and green-emitting ($\lambda_{max}$ at 530 nm) InP/GaP/ZnS core-shell-shell (CSS) QDs.

At 12, a core-forming metal complex is formed. The core-forming metal complex may be a chelate of a group IIIA metal ion (group-13 under IUPAC rules). The core-forming metal complex may be a trivalent indium chelate, for example. To form the core-forming metal complex, a suitable metal salt—e.g., an anhydrous or hydrated form of indium acetate, indium nitrate, or indium chloride—is combined with oleic acid or another suitable ligand or ligand mixture. Suitable ligands include various carboxylic acids, amines, thiols, phosphines, phosphine oxides and imines, for example. The core-forming metal complex may include, accordingly, one or more carboxylate complexes. Octanoate and oleate conjugate bases are believed to form a mixture of chelate-type coordination complexes with $In^{3+}$ and other metals—e.g., $In(O_2CR/O_2CR')_3$, with $R=C_7H_{15}$ and $R'=C_{17}H_{33}$. Oleate and octanoate function as stabilizing ligands during core growth, preventing aggregation and agglomeration of the growing QD cores. They also provide steric hindrance, which facilitates core-size control. In one example, octanoic and oleic acids may be used in a 1:1 molar ratio, and in excess relative to indium.

In some embodiments, a divalent zinc carboxylate salt, such as zinc acetate dihydrate, may be incorporated into the core-forming metal complex in an equimolar amount relative to trivalent indium. Zinc is believed to enhance the PLQY of the final product as it 'etches back' the surface of the growing InP nanocrystal. Alternately, zinc is believed to preferentially attack high energy centers, which may be defect sites. To reflect the fact that a non-stoichiometric amount of Zn may be incorporated onto the InP core, the designation 'InZnP' may be used in place of 'InP' in some embodiments.

Continuing in method 10, the reaction to form the core-forming metal complex may be conducted at 110° C. in 1-octadecene solvent for a minimum of one hour, preferably two hours under reduced pressure. Such conditions are believed to drive the equilibrium by volatilizing waters of hydration originating with hydrated forms of the indium salt (if any) as well as the acetic, nitric, and/or hydrochloric acid by-products. In this manner, the original anions acetate, nitrate and/or chloride may be removed from the reaction system. High-boiling octanoic and oleic acids, however, remain in liquid form under the reaction conditions.

Separately, at 14, a solution of a pnictogen compound is prepared. The pnictogen compound may include an amine, phosphine, or arsine, for example. In some examples, the solution may be prepared in deoxygenated 1-octadecene or similar solvent. In one embodiment, the pnictogen compound may include tris(trimethylsilyl)phosphine, $P(Si(CH_3)_3)_3$. Further, the solution of the pnictogen compound may be made and stored under dry nitrogen.

At 15, at temperatures of about 200 to 300° C., preferably at temperatures of about 230 to 290° C., and more preferably at temperatures of about 270 to 290° C., the solution of the core-forming metal complex is combined with the solution of the pnictogen compound to form a solution of nanocrystalline core material, such as InP. Reaction time may be controlled to provide QDs of the desired size and emission characteristics. Although the details provided herein appropriately describe the formation of InP cores, this aspect is by no means necessary. Other envisaged nanocrystalline core materials include the III-V semiconductors indium nitride (InN), gallium nitride (GaN), GaP, and gallium arsenide (GaAs), for example.

Subsequently in method 10, an intermediate shell may be assembled upon the nanocrystalline core. The intermediate shell may perform various functions. First, the intermediate shell may passivate the surface of the nanocrystalline core material. For example, an InP core may present dangling bonds, which may be trap sites for non-radiative recombination. A GaP intermediate shell may be used to passivate these dangling bonds, resulting in increased quantum efficiency for radiative recombination. Second, the intermediate shell may serve as an intermediary layer between the nanocrystalline core and the outer shell. The lattice mismatch between InP and ZnS is about 8%, but the lattice mismatch between InP and GaP is about 7%, the lattice mismatch between InP and ZnSe is about 4%. Better lattice matching reduces the number of interfacial defect sites, thereby increasing the PLQY. Accordingly, a suitable intermediate-shell-forming metal complex forming salt—e.g., an anhydrous or hydrated form of gallium acetate, gallium nitrate, or gallium chloride—may be combined at 16 with a molar excess of an organic acid, such as oleic acid. This forms an intermediate-shell-forming metal complex—e.g., $Ga(O_2C—R')_3$. The reaction may be accomplished at 110° C. for two hours under reduced pressure, as described above for the analogous core-forming metal complex.

At 18, the solution containing the intermediate-shell-forming metal complex is added to the solution containing the nanocrystalline core, to form, for example, an InP/GaP QD system. This reaction may be accomplished at 175 to 300° C. for 15 to 60 minutes.

After the above transformation is complete, a ligand-terminated outer shell may be formed on each QD. To that end, an outer-shell-forming metal complex is formed, at 20. The outer-shell-forming metal complex may be a chelate of a group IIB metal ion (group-12 under IUPAC rules). The outer-shell-forming metal complex may be a divalent zinc chelate, for example. To form the outer-shell-forming metal complex, a suitable metal salt—e.g., zinc acetate, is combined with a slight molar excess of a carboxylic acid (oleic acid, for example).

Separately, at 21, a solution of one or more chalcogen compounds is prepared. Such chalcogen compounds may include thiols, disulfides, or selenols, for example. In one example, a mixed thiol or corresponding disulfide solution—e.g., 1-dodecanethoil and 1-hexanethiol (at any suitable ratio) may be combined with 1-octadecene as solvent. At 22, the outer-shell-forming metal complex and the chalcogen compound solution are combined with the solution of nanocrystalline core material to form the shelled QD product—InP/GaP/ZnS($L_x$), for example, where L=1-dodecanethiolate and/or 1-hexanethiolate.

Figure 2:
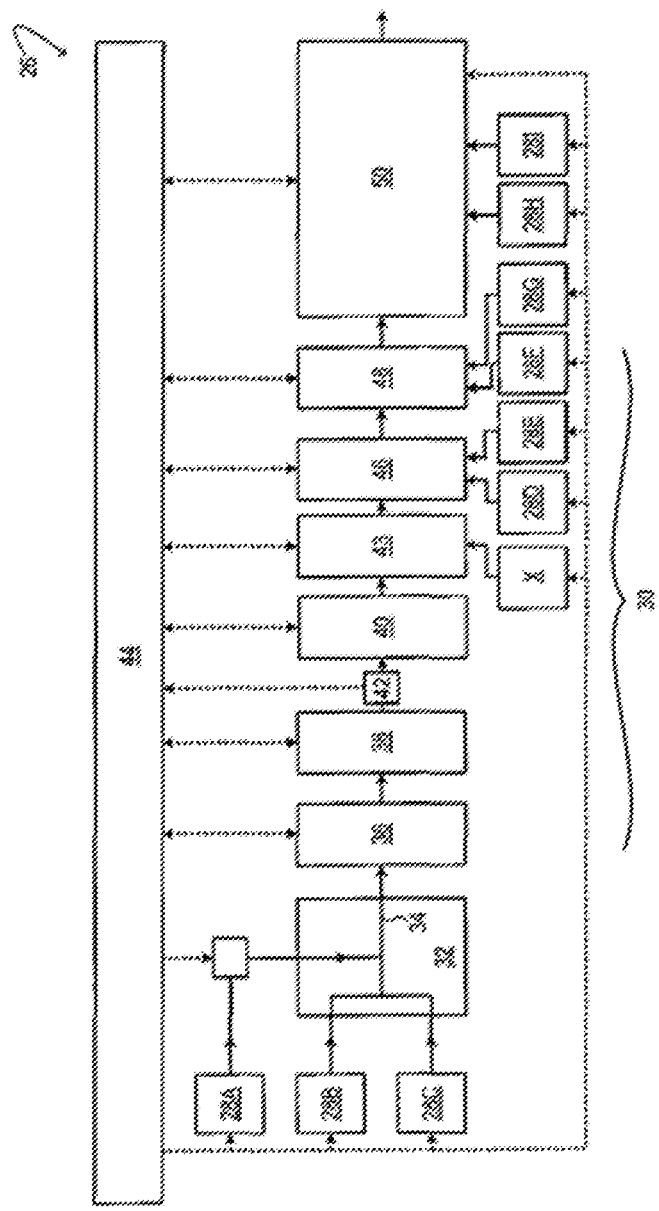
FIG. 2 shows aspects of an example continuous-flow reactor system.

The above process, summarized also in FIG. 2, yields a lipophilic core-shell-shell (CSS) QD material. In the case of InP/GaP/ZnS($L_x$), the emission wavelength of the material ranges from 500 to 650 nm when excited at 400 or 450 nm. Thermogravimetric analysis (TGA) shows the organic content—in the form of n-alkyl ligands stabilizing the QDs—to be 20 to 30% in some examples.

No aspect of the foregoing method is intended to be limiting in any way, for numerous variations, additions, and omissions are contemplated as well. In some embodiments, for instance, a zinc selenide (ZnSe) outer shell may be used in place of the ZnS outer shell described above. In that case, corresponding selenols may be used at 20, in place of the thiols. In addition, the intermediate shell may not be necessary for all applications, as other strategies may be used to passivate dangling bonds of a QD core or outer shell. In some embodiments, therefore, steps 16 and 18 of method 10 may be omitted, to yield a single-shelled product—e.g., InP/ZnS($L_x$) or InP/ZnSe($L_x$).

At 24 of method 10, the QD product may be further purified. In one embodiment, QDs may be precipitated from 1-octadecene solution by addition of a polar solvent, such as acetone. The solid QD material may be collected by filtration or by centrifugation, while supernate containing unreacted starting materials and other impurities may be discarded or recycled. The solid is then washed with additional acetone and redissolved in a nonpolar solvent such as 1-octadecene or n-hexane. This purification process may be repeated two to four times, or until the desired purity is achieved.

In some embodiments, the steps above may be enacted via batch processing. In other embodiments, continuous-flow processing may be used. In yet other embodiments, at least some of the precursor solutions—e.g., $In(O_2CR/O_2CR')_3$ and $P(Si(CH_3)_3)_3$—may be premixed together prior to use in a continuous-flow cell processing method.

FIG. 2 shows aspects of an example continuous-flow reactor system 26. The continuous-flow reactor system includes a plurality of fluid sources 28, which may include compressed-gas cylinders, pumps, and/or liquid reservoirs, for example. The continuous-flow reactor system also includes a plurality of reaction devices 30 and a segmentation device 32. In the illustrated example fluid sources 28B and 28C may provide, respectively, the core-forming metal complex solution and the pnictogen compound solution.

Continuous-flow reactor system 26 includes a flow path for the reaction mixture comprising a primary conduit 34 that passes through the plurality of reaction devices 30. In segmentation device 32, an immiscible, non-reacting fluid (e.g., a relatively inert gas such as nitrogen, argon, or helium) is inserted into the flow path to provide segmented flow of the reaction mixture. The segmented flow provides a narrower distribution of residence times in downstream reaction devices than without segmentation.

From segmentation device 32, the segmented reaction mixture and immiscible fluid pass into energized activation stage 36, where the mixture is rapidly energized by an energy source—e.g., a monomodal, multimodal or multi-variable frequency microwave source, a light source such as a high energy lamp or laser, a high temperature thermal (e.g., resistive heating) device, a sonicating device, or any suitable combination of energy sources. Here, the QDs are rapidly and uniformly nucleated. Accordingly, method 10 above may further include thermally activating the combined core-forming metal complex and pnictogen compound. The flow of the formed core and precursors then passes into incubation stage 38, where a heat source promotes growth of the nucleated precursors of the nanocrystalline core material under continuous-flow conditions. The process is quenched in collection stage 40, where the QD-containing solution may optionally be separated from the immiscible, non-reacting fluid. In other implementations, energized activation stage 36 may be omitted, as nucleation and growth may occur in a same reactor stage.

In the example of FIG. 2, analytical device 42 is arranged fluidically upstream of collection stage 40. In the analytical device, an assay may be conducted that tests one or more physical properties of the QDs emerging from incubation stage 38. In some examples, the analytical device may communicate with process controller 44. The process controller 44 comprises an electronic control device operatively coupled to fluid sources 28 and to various inputs of reaction devices 30. Such inputs may include energy flux in energized activation stage 36, heating in incubation stage 38, and various flow-control componentry arranged throughout reactor system 26. Closed-loop feedback based on the property or properties assayed in the analytical device may be used to automatically optimize or adjust QD size, composition, and/or other properties.

Continuing in FIG. 2, continuous-flow reactor system 26 includes an intermediate-shell fabrication stage 46 fluidically downstream of collection stage 40, and an outer-shell fabrication stage 48 fluidically downstream of the intermediate-shell fabrication stage 46. Reactor system 26 of FIG. 2 also includes a purification stage 50 arranged downstream of outer-shell fabrication stage 48. The structure and function of purification stage 50 may differ in the different embodiments of this disclosure, as various modes of QD purification lie within the spirit and scope of this disclosure. Such modes may include removal of impurities by flocculation, liquid-liquid extraction, distillation, and electrodeposition, as examples. Any or all of the above purification modes may be used in combination. In some embodiments, however, one mode may be used to the exclusion of the others.

In one example, the continuous flow reactor system 26 includes, between the collection stage 40 and the intermediate shell manufacturing stage 46, a modifier treatment stage 43 that performs treatment using a modifier. Here, a modifier comprising chlorine and/or bromine is introduced into the solution containing the nanocrystalline core material, and the surface of the nanocrystalline core material is treated with the modifier. In addition, the continuous flow reactor system may include a second modifier treatment stage between the intermediate shell manufacturing stage 46 and the outer shell manufacturing stage 48, and in another example the continuous flow reactor system may include a third modifier treatment stage between the outer shell manufacturing stage 48 and the purification stage 50. The continuous flow reactor system 26 may have a fluid source X connected to each modifier treatment stage in such a way that a modifier can be introduced.

In yet another example, the continuous flow reactor system 26 may not include an independent modifier treatment stage, in which case the fluid source X may be connected to any one or more of a collection stage 40, an intermediate shell manufacturing stage 46, and an outer shell manufacturing stage 48.

In either example, modifier treatment may be performed within the stage to which the fluid source X is connected and/or in other stages located downstream thereof.

Also, in certain examples, it is preferable not to have a purification stage after collection stage 40 or before intermediate shell manufacturing stage 46. By doing this, it is possible to prevent the concentration of the modifier introduced in the collecting stage 40 or the modifier treating stage 43 immediately thereafter from decreasing.

Returning now to FIG. 1, closed-shell chloride (Cr⁻) and/or closed-shell bromide (Br⁻) may be introduced into the reaction system to passivate defect states at the interface of the InP core and a wider band-gap shell (GaP, ZnS, or ZnSe) and/or the surface of the wider band-gap shell. In some examples, modifier treatment is enacted before shell forming. At 52, accordingly, the nanocrystalline core material is treated with a modifier. In one embodiment, the modifier may include a chloride salt and/or a bromide salt, such as $GaCl_3$, $InCl_3$, $GaBr_3$ and $InBr_3$. Lipophilic chloride salts such as tetra-n-butylammonium (TBA) chloride may also be used. Treatment with the modifier is typically enacted in a solution of a non-polar solvent in which the nanocrystalline core material is soluble. In some embodiments, modifier treatment is enacted at elevated temperatures—e.g., 200 to 250° C. Table 1 shows the results of modifier treatment before shell synthesis on the optical properties of InP/ZnS QDs. The photoluminescence properties reported herein are for 400-nm excitation. The data shows a significant PLQY enhancement for treatment with chloride salts $GaCl_3$ and $InCl_3$ relative to control experiments in which a non-chloride salt, or no additive, was used.

TABLE 1

| ADDITIVE | PLQY/% | λ max/nm | FWHM/nm |
|---|---|---|---|
| gallium chloride. $GaCl_3$ | 80 | 541 | 76 |
| indium chloride. $InCl_3$ | 83 | 542 | 78 |
| indium acetate, $In(OAc)_3$ | 41 | 540 | 83 |
| none | 47 | 520 | 63 |

Figure 3A:
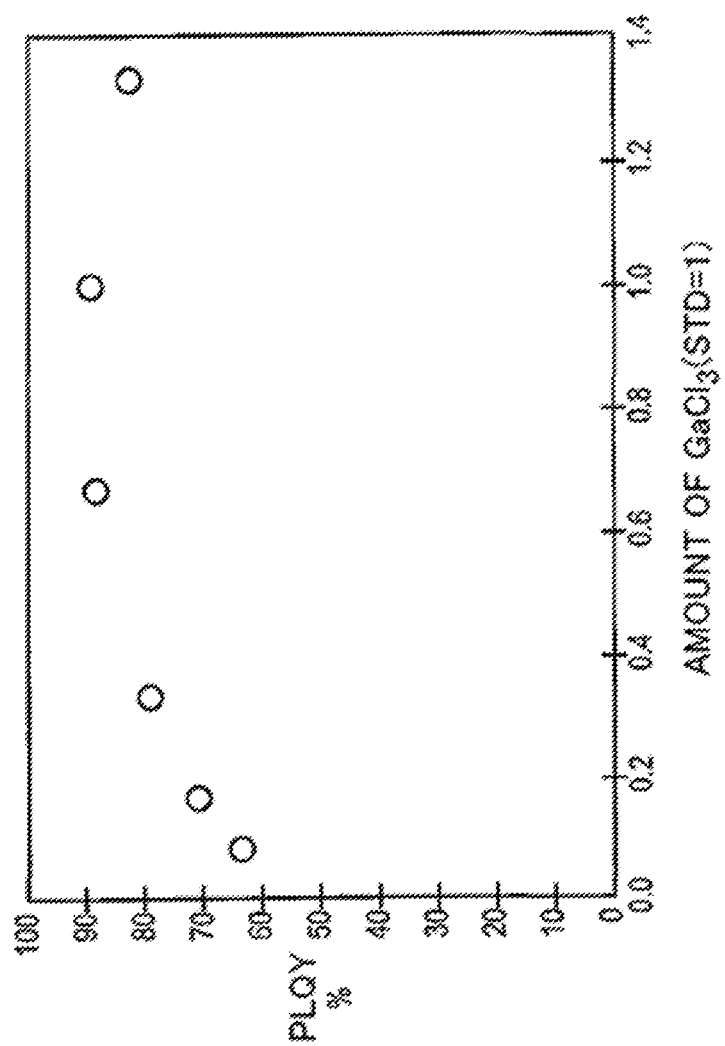
FIG. 3A is a graph showing an effect of amount of added modifier on the PLQY of an InP/ZnS QD material.
Figure 3B:
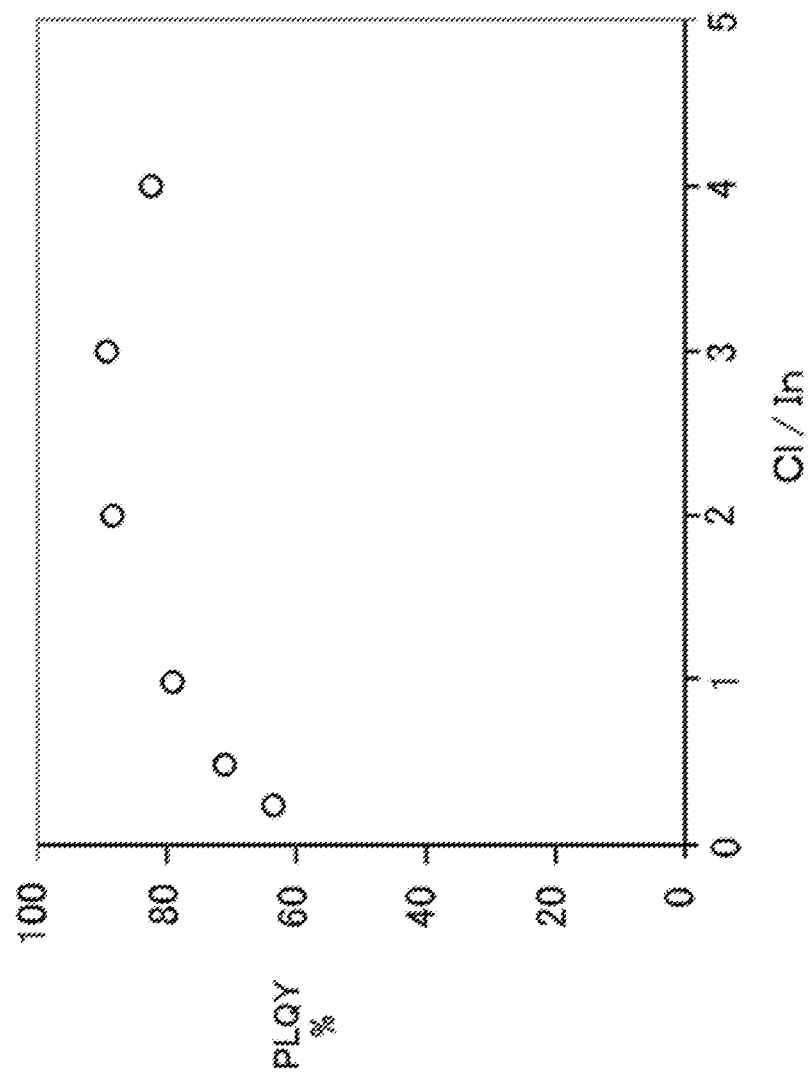
FIG. 3B is a graph showing an effect of amount of added modifier on the PLQY of an InP/ZnS QD material.

The graph of FIG. 3 shows the effect of varying the quantity of added $GaCl_3$ on the PLQY. In FIG. 3A, the horizontal axis indicates the added amount of $GaCl_3$ as an index. In FIG. 3B, the horizontal axis represents the added amount of Cl with respect to In in molar ratio. In view of the fact that the PLQY was found to vary as a function of the amount of modifier added, a workable strategy for optimizing the PLQY may be to monitor the photoluminescence of the nanocrystalline core material as modifier is titrated into the system. The final amount of the modifier may be regulated in a closed-loop manner, so as to maximize the photoluminescence.

In other embodiments, the modifier may include a carboxylic acid chloride or a carboxylic acid bromide instead of a chloride or bromide salt. Examples include stearic acid chloride, lauric acid chloride, oleic acid chloride, stearic acid bromide, lauric acid bromide, or oleic acid bromide. Table 2 shows the results of InP/ZnS QD treatment with carboxylic acid chlorides. Various other chlorine-containing or bromine-containing organic compounds may be used alternatively, such as tertiary alkyl or aryl chlorides, or tertiary alkyl or aryl bromides.

By using a carboxylic acid chloride or a carboxylic acid bromide as a modifier, there is an advantage that the metal concentration and chlorine/bromine concentration in the reaction solution can be independently controlled as compared with metal chlorides and metal bromides. As a result, undesired side reactions and metal doping into the QD can be prevented, and an increase in emission full width at half maximum (FWHM) can be suppressed. In addition, it is liquid, has good compatibility with an organic solvent, and is easy to handle. Particularly, carboxylic acid chlorides having a high boiling point (for example, 200° C. or higher) are suitable for continuous-flow synthesis.

Furthermore, Table 2 shows the QD optical properties stored for 10 days at room temperature, in the air, in a non-shielding environment. Even after storage for 10 days, the deterioration is small, indicating that it shows high PLQY. Generally, in QD, due to oxidation or the like, a decrease in PLQY occurs with time. In particular, it is considered that oxidation and the like are likely to occur preferentially in the position where surface defects are present. On the other hand, in the QD of the present invention in which defects are passivated by a sufficient amount of modifier, it is considered that the reduction of PLQY due to aging could be made extremely small.

TABLE 2

| | RESULT | | | | | |
|---|---|---|---|---|---|---|
| | EXPERIMENT DAY | | | TEN DAYS AFTER EXPERIMENT | | |
| ADDITIVE | PLQY/% | λ max/nm | FWHM/nm | PLQY/% | λ max/nm | FWHM/nm |
| $GaCl_3$ | 84 | 533 | 71 | 76.7 | 532 | 71 |
| stearoyl chloride | 82 | 526 | 64 | 75.2 | 526 | 64 |
| lauroyl chloride | 80 | 526 | 62 | 75.1 | 524 | 61 |

In these experiments, the treated nanocrystalline core material was combined with the outer-shell-forming metal complex and chalcogen compound without prior formation of a lattice-matching intermediate shell. However, treatment of suitable CSS structures with the modifier is also envisaged.

The foregoing methodology demonstrates modifier treatment prior to formation a wider band-gap shell on a nanocrystalline core material. Alternatively, or in addition, treatment with a modifier may be enacted after formation of the wide band-gap shell. At 54 of method 10, accordingly, the shelled nanocrystalline core material is treated with the modifier. Naturally, the two modifier-treatment steps may be used separately or in combination. Table 3 shows the results of chloride addition after shell synthesis on the optical properties of InP/ZnS. Again, a significant PLQY enhancement is observed.

TABLE 3

| | RESULT | | | | | |
|---|---|---|---|---|---|---|
| | BEFORE ADDITION | | | AFTER ADDITION | | |
| ADDITIVE | PLQY/% | λ max/nm | FWHM/nm | PLQY/% | λ max/nm | FWHM/nm |
| GaCl$_3$ | 45 | 511 | 57 | 55 | 510 | 54 |
| oleoyl chloride | 48 | 513 | 57 | 61 | 512 | 57 |

In addition, it is possible to modifier treat the core/shell interface and the shell surface simultaneously with the modifier by adding an excess amount of the modifier before forming the shell and then forming the shell without purification. Here, the excess amount means a state in which unreacted modifier remains even when shell formation is completed. By doing so, it is possible to progress the shell-forming reaction in the presence of a sufficient amount of the modifier from the initial stage of shell formation to the final stage of shell formation without interruption, and thereby an increased photoluminescence quantum yield can be obtained.

The same applies to the case of forming the intermediate shell, and it is preferable to supply an excess amount of the modifier in advance before forming the intermediate shell. Here, the excess amount means a state in which unreacted modifier remains even when the formation of the outer shell is completed. For example, a modifier containing chlorine and/or bromine which is 100 mol % or more, preferably 200 mol % or more, with respect to the supply amount of group III element (for example, In) forming the core, is supplied before forming the shell. When the modifier is added in plural times, the total amount thereof should be supplied. By doing so, in addition to the above-mentioned effects, it is possible to modifier treat all of the core surface, the interface between the intermediate shell and the outer shell, and the surface of the outer shell by a single supply of the modifier.

On the other hand, when the amount of chlorine and/or bromine contained in the additive with respect to the supply amount of the group III element (for example, In) forming the core exceeds 300%, agglomeration tends to occur, so it should preferably be 300% or less.

After supplying the modifier, it is preferable not to perform, until formation of the shell is completed, the operation that causes the lowering of the concentration of the modifier with respect to the solution containing the core and the modifier, such as purification, exchange of the dispersion medium, additional supply of the group III element (for example, In) which forms the core are carried out. If these are carried out, it is preferable to maintain the concentration of the modifier by carrying out additional supply of the modifier or the like.

In such a method, a modifier including a carboxylic acid chloride and/or a carboxylic acid bromide is preferable because it can suppress undesirable side reactions in a plurality of steps.

Table 4 shows the results on optical properties in the state of, InP core, InP/ZnSe having a core/shell structure by forming a shell thereon, and InP/ZnSe/ZnS having a core/shell/shell structure by forming a shell thereon, respectively. In any state, a marked increase in PLQY by modifier treatment is confirmed.

TABLE 4

| | RESULT | | | | | | | | |
|---|---|---|---|---|---|---|---|---|---|
| | InP | | | InP/ZnSe | | | InP/ZnSe/ZnS | | |
| | PLQY/% | λ max/nm | FWHM/nm | PLQY/% | λ max/nm | FWHM/nm | PLQY/% | λ max/nm | FWHM/nm |
| with chloride treatment | 40 | 497 | 39 | 56 | 510 | 38 | 77 | 518 | 38 |
| no chloride treatment | — | — | — | 17 | 491 | 38 | 53 | 506 | 40 |

Table 5 shows the results on the optical properties of InP/ZnS core-shell QD at 450 nm excitation in the case of different modifiers. Halogens of fluorine, chlorine, bromine and iodine were supplied using GaF$_3$, GaCl$_3$, GaBr$_3$, and GaI$_3$, respectively.

As the ion radius of the halogen increases, the wavelength shifts to blue wavelength. PLQY becomes large when the halogen species are chlorine and bromine, and in particular, in the case of chlorine, it shows the highest PLQY and at the same time the emission full width at half maximum FWHM is smaller than that in the case of bromine or fluorine. Compared with chlorine and bromine, PLQY showed relatively small values in the case of fluorine or iodine. The reason for this is not certain but, for example, the following reasons are conceivable. Since Cl and Br are observed in the measurement results of XPS and WDX, it is considered that Cl and Br may play a role of filling the gaps of the ligands and the surface defects of the elements during the treatment with chlorides and/or bromides. In that case, if Cl and Br are added in large amounts, aggregation and precipitation occur, so it is thought that Cl and Br adhere to the surface as ions. Since, for example, oleic acid and thiol are present on the QD surface as ligands, it is difficult for iodine having a large ionic radius to access the QD surface, and on the contrary, defects on the surface cannot be filled with fluorine which is too small in ionic radius, thereby it is considered that high PLQY improvement could not be obtained. In other words, by selecting chlorine or an element larger than chlorine as a halogen species, surface defects can be sufficiently filled, and by selecting bromine or an element smaller than bromine, a sufficient adsorption is possible for QD with ligands existing on the surface thereof.

Furthermore, the inventors found that by selecting chlorine, it is possible to achieve both the largest improvement in PLQY and the smallest emission full width at half maximum FWHM.

TABLE 5

| | PLQY/% | λ max/nm | FWHM/nm |
|---|---|---|---|
| F (fluorine) | 57 | 546 | 98 |
| Cl (chlorine) | 66 | 535 | 82 |
| Br (bromine) | 61 | 531 | 92 |
| I (iodine) | 28 | 529 | 74 |

Table 6 shows the results on the optical properties of InP/ZnS. Specifically, 11.7 mmol of octanoyl chloride was added to 400 ml (In 10 mmol, P 8 mmol) of InP nanocrystalline core solution synthesized by the continuous flow process and subjected to chloride treatment at 250° C. for 30 minutes. Thereafter, 160 mmol of zinc oleate and 80 mmol of 1-hexanethiol were added and reacted for 60 minutes. Further, 80 mmol of 1-dodecanethiol was added and reacted for 60 minutes to form a ZnS shell. In this example, the supply amount of the modifier (octanoyl chloride) corresponds to 117 mol %, which is the supply amount of the group III element (In) forming the core. The InP/ZnS QD of Table 6 synthesized using the continuous flow process has a further reduced emission full width at half maximum (FWHM) compared to the InP/ZnS QD of Table 2 synthesized using a batch process.

TABLE 6

| ADDITIVE | PLQY/% | λ max/nm | FWHM/nm |
|---|---|---|---|
| octanoyl chloride | 70 | 534 | 58 |

Figure 4:
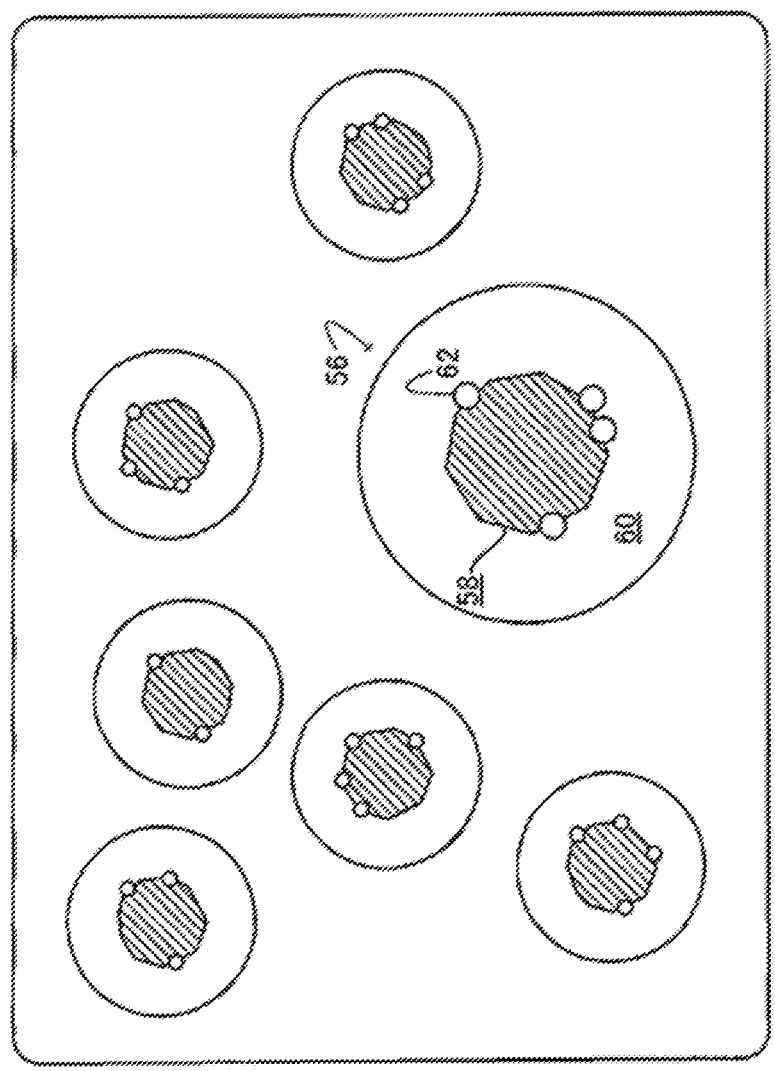
FIG. 4 schematically shows aspects of an example product of the preparation method of FIG. 1.

FIG. 4 schematically shows aspects of an example product of the preparation method described above. The product is a quantum dot material comprising a plurality of nanoscopic core-shell structures 56, each structure including a QD core 58, a wider-bandgap shell 60, and adherent chlorine and/or adherent bromine 62. As noted above, the core may be an InP core, and the shell may be a ZnS or ZnSe shell. In some embodiments, the adherent chlorine and/or adherent bromine atoms may be present at 2 to 15% by mass, preferably 4 to 8% by mass of the quantum dot material. Moreover, in some embodiments, the amount of adhered chlorine and/or bromine is at least 50 mol %, more preferably at least 100 mol %, or 200 mol % or more of the amount of group III element (for example, In) forming the core. By including a sufficient amount of chlorine and/or bromine in the quantum dot materials in this way, it is possible to sufficiently occupy the defect sites present on the core surface and the shell interface, and thus an extremely increased photoluminescence quantum yield can be obtained. The upper limit of the amount of adhered chlorine and/or bromine is not particularly limited, but it is preferably less than 300 mol %.

The amount of adhered chlorine and/or bromine can be measured as a ratio with other elements in wavelength dispersive X-ray analysis (WDX). For example, it is precipitated by adding acetone to the nanocrystals of the core/shell structure having the composition of InP/ZnS shown in Table 6. Further, after separating the nanocrystals and the solution by centrifugation, the nanocrystals are dispersed in hexane. By repeating these steps, the nanocrystals can be purified. The composition analysis results of the purified nanocrystals by WDX are shown in Table 7. In this example, the amount of chlorine accounts for about 4.2% of the quantum dot material. Further, the molar ratio to In is 134%.

TABLE 7

| ELEMENT | THE MOLAR RATIO TO INDIUM |
|---|---|
| S | 13.35 |
| Zn | 15.26 |
| In | 1.00 |
| Cl | 1.34 |
| P | 0.74 |

Figure 5:
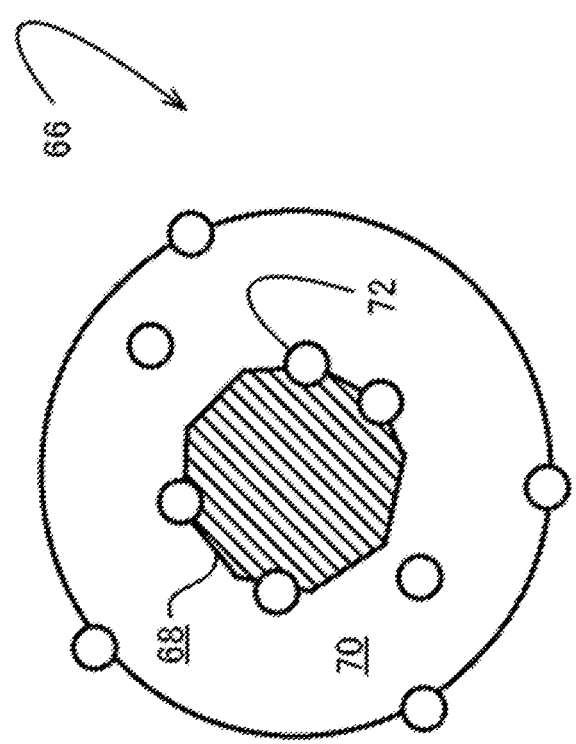
FIG. 5 schematically shows an embodiment of the product of another example of the preparation method of FIG. 1.

In some embodiments (when modifier treatment is enacted prior to shell formation), the adherent chlorine and/or adherent bromine of each core-shell structure may be arranged between the core and associated shell—viz., on defect sites of the core nanocrystal—as shown in the drawing. In other embodiments (when modifier treatment is enacted after shell formation), the adherent chlorine atoms and/or adherent bromine may occupy defect sites on the exterior surface of the shell. In yet another embodiment (when modifier treatment is performed after formation of the intermediate shell and before the formation of the outer shell), it is possible that adhered chlorine and/or bromine atoms can occupy defect sites at the interface between the intermediate shell and the outer shell. The appearance of one example of the product in these embodiments is schematically shown in FIG. 5. The nanoscopic core-shell structure 66 shown in FIG. 5 is a quantum dot material comprising a QD core 68, a shell 70 having a wider bandgap, and attached chlorine and/or bromine atoms 72. In the example of the nanoscopic core-shell structure 66 shown in FIG. 5, adherent chlorine and/or bromine atoms 72 are also present on the shell surface and, in the case where a plurality of shells are formed, chlorine and/or bromine atoms 72 adhering to the shell surface and/or the shell-shell interface are present.

Figure 6:
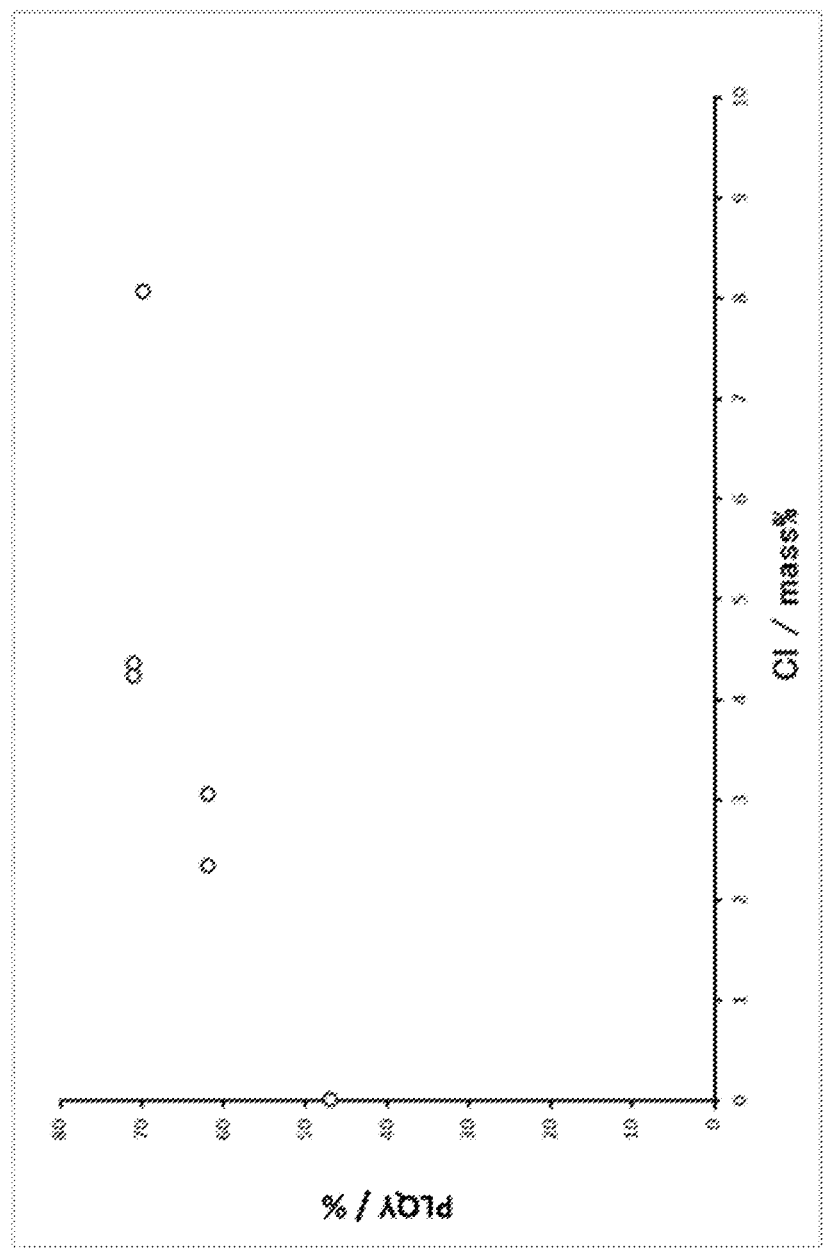
FIG. 6 is a graph showing the value of PLQY with respect to the amount (mass %) of chlorine in the quantum dot material.

The graph of FIG. 6 shows the value of PLQY with respect to the amount (mass %) of chlorine in the quantum dot material (InP/ZnS). When the amount of chlorine contained is 2 mass % or more, PLQY can be greatly improved as compared with quantum dot material containing chlorine content of 0 mass % (when modifier treatment is not performed). Furthermore, PLQY can be further improved when the content of chlorine is 4 mass % or more.

Figure 7:
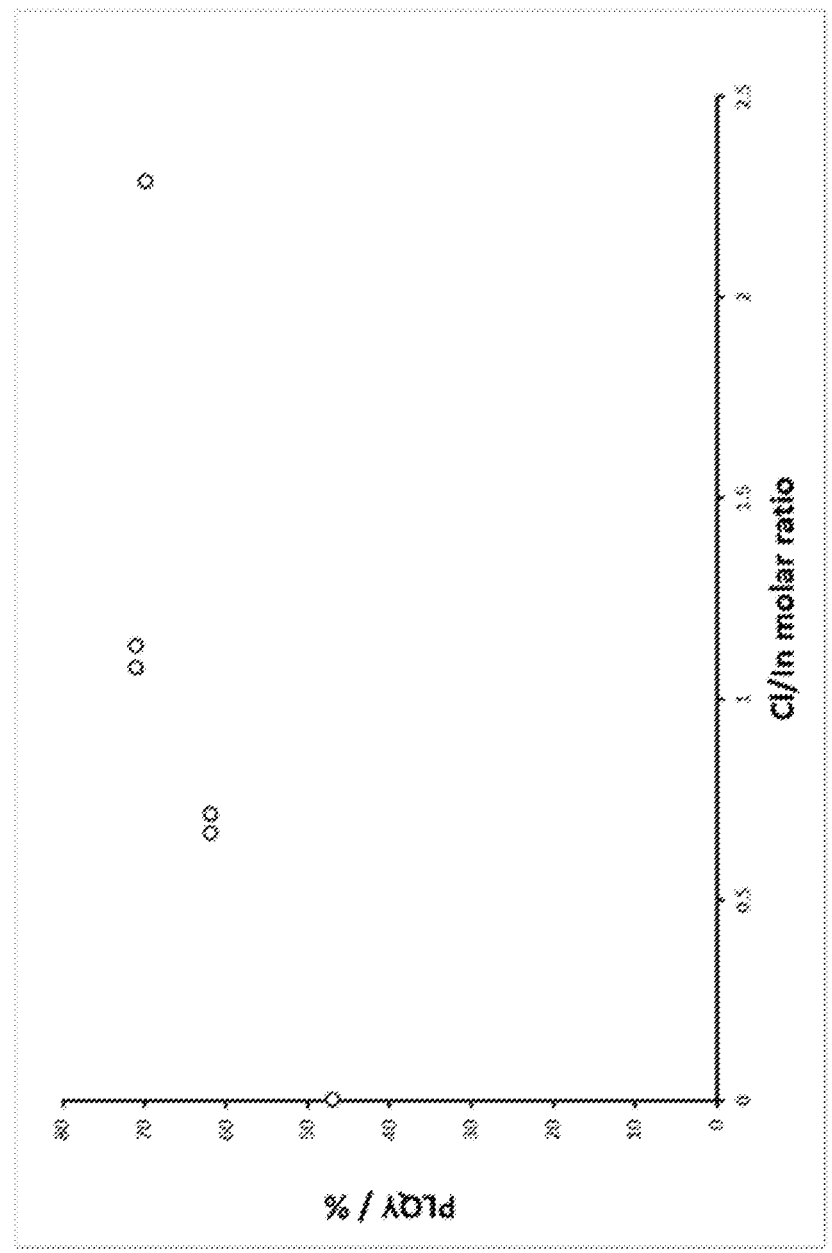
FIG. 7 is a graph showing PLQY value with respect to the molar ratio (Cl/In) of Cl and In in the quantum dot material of FIG. 6.

FIG. 7 shows the molar ratio of chlorine content to In in the quantum dot material of FIG. 6 (horizontal axis) and PLQY for each contained chlorine amount on the vertical axis. By making Cl/In molar ratio larger than 0.5, PLQY can be improved dramatically. The PLQY can be further improved by making the molar ratio Cl/In greater than 1. Even when the molar ratio of Cl/In is larger than 2, a high PLQY is maintained.

In another embodiment, the exterior of the modifier-treated core-shell nanocrystals can be further coated with an inorganic material different from the shell material. The inorganic material covering the shell material need not epitaxially grow on the surface of the shell, e.g. it may be amorphous, or it may not be covalently bonded to the shell. In addition, it is preferable that the inorganic material covering the shell material is an insulator. Here, the insulator is one having a resistivity of $10^8 \Omega \cdot cm$ or more. Preferred shell materials include, for example, $Al_2O_3$, $SiO_2$, ZnO, $TiO_2$, $Y_2O_3$, $HfO_2$, MgO and the like. Above all, $Al_2O_3$ and $SiO_2$ are often used as a barrier layer, which is preferable. The inorganic material layer formed on the shell can prevent release of chlorine atoms and/or bromine atoms present in the nanocrystals or on the nanocrystal surface. For example, when it is introduced into an LED, it is possible to prevent deterioration of resin or electrodes around the nanocrystal due to chlorine or bromine.

The concentration of chlorine and/or bromine in the inorganic layer is preferably lower than the concentration of chlorine and/or bromine contained in the shell layer (core-shell interface, shell-shell interface, and/or shell surface). It is further preferable that the inorganic material layer is substantially free of chlorine and/or bromine. This makes it possible to prevent deterioration of the resin and electrodes around the nanocrystals even when chlorine and/or bromine is contained in the shell layer in an amount sufficient to greatly improve PLOY. Such a structure can be obtained by sufficiently lowering the concentration of chlorine and/or bromine in the dispersion medium of the nanocrystals by, for example, purifying before formation of the inorganic layer. Alternatively, the inorganic layer may be formed after replacing with another dispersion medium not containing chlorine and/or bromine.

It will be understood that the configurations and/or approaches described herein are presented for example, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of this disclosure includes all novel and nonobvious combinations and subcombinations of the various processes, systems and configurations, and other features, functions, acts, and/or properties disclosed herein, as well as any and all equivalents thereof.

The invention claimed is:

1. A quantum dot material, comprising:
a plurality of nanoscopic core-shell structures, each nanoscopic core-shell structure including
a nanocrystalline core including phosphorus and indium,
a shell disposed on the nanocrystalline core; and
a modifier comprising at least one of chlorine and bromine, wherein
the modifier is present on a surface of the nanocrystalline core and an exterior surface of the shell, and
the content of chlorine and/or bromine is within a range of 2 to 15 mass % of the quantum dot material.

2. The quantum dot material according to claim 1, wherein the content of chlorine and/or bromine is within a range of 4 to 8 mass % of the quantum dot material.

3. The quantum dot material according to claim 1, wherein the nanocrystalline core comprises InP and the shell comprises ZnS.

4. The quantum dot material according to claim 1, wherein the quantum dot material further includes an intermediate shell between the shell and the nanocrystalline core, and the intermediate shell includes ZnSe.

5. The quantum dot material according to claim 1, wherein the quantum dot material comprises an inorganic material layer on the shell.

6. The quantum dot material according to claim 5, wherein the inorganic material layer is one or more of $Al_2O_3$, $SiO_2$, $ZnO$, $TiO_2$, $Y_2O_3$, $HfO_2$ and $MgO$.

7. The quantum dot material according to claim 1, wherein a photoluminescence quantum yield (PLQY) of the quantum dot material is 80% or more.

8. The quantum dot material according to claim 1 wherein a photoluminescence quantum yield (PLQY) of the quantum dot material after leaving the quantum dot material indoors for 10 days is 70% or more.

9. A method for producing a quantum dot (QD) material, comprising:
mixing a core-forming metal complex with a pnictogen compound to form a nanocrystalline core material,
adding a modifier containing one or more of chlorine and/or bromine to a solution containing the nanocrystalline core material,
modifier treating a surface of the nanocrystalline core material with a modifier to form a modifier-treated nanocrystalline core,
mixing an outer shell-forming metal complex and a chalcogen compound with a solution containing the modifier-treated nanocrystalline core material to form an outer shell on each modified nanocrystalline core material, and
modifier treating an exterior surface of the outer shell with the modifier added to the solution containing the nanocrystalline core material.

10. The method according to claim 9, further comprising, before forming the outer shell:
forming an intermediate shell on a surface of the modifier-treated nanocrystalline core material, and
modifier treating an exterior surface of the intermediate shell with the modifier added to the solution containing the nanocrystalline core material.

11. The method according to claim 9, wherein the modifier comprises one or more of a carboxylic acid chloride and/or a carboxylic acid bromide.

12. The method according to claim 9, further comprising adjusting a molar ratio of the modifier such that a content of chlorine and/or bromine in the resultant quantum dot material is within a range of 2 to 15 mass %.

13. The method according to claim 9, wherein the core-forming metal complex comprises a chelate of a group IIIA metal ion, and the outer shell-forming metal complex comprises a chelate of a group IIB metal ion.

14. The method according to claim 9, wherein the core-forming metal complex comprises a chelate of trivalent indium.

15. The method according to claim 9, wherein the outer shell-forming metal complex comprises a divalent zinc chelate.

16. The method according to claim 9, wherein one or more of the core-forming metal complex and/or the outer shell-forming metal complex comprises a carboxylate complex.

17. The method according to claim 9, wherein the modifier comprises a carboxylic acid chloride.

18. The method according to claim 9, wherein the chalcogen compound comprises a thiol, a disulfide, or a selenol.

19. The method according to claim 9, wherein the method comprises a batch process.

20. The method according to claim 9, wherein the method comprises a continuous flow process.

* * * * *